US012709248B2

(12) United States Patent
Adachi

(10) Patent No.: US 12,709,248 B2
(45) Date of Patent: Aug. 18, 2026

(54) SENSOR CLEANING APPARATUS,SENSOR CLEANING METHOD, AND SENSOR CLEANING PROGRAM

(71) Applicant: DENSO CORPORATION, Kariya-city (JP)

(72) Inventor: Shota Adachi, Kariya-city (JP)

(73) Assignee: DENSO CORPORATION, Kariya (JP)

( * ) Notice: Subject to any disclaimer, the term of this patent is extended or adjusted under 35 U.S.C. 154(b) by 2 days.

(21) Appl. No.: 18/945,725

(22) Filed: Nov. 13, 2024

(65) Prior Publication Data

US 2025/0065848 A1 Feb. 27, 2025

Related U.S. Application Data

(63) Continuation of application No. PCT/JP2023/012328, filed on Mar. 27, 2023.

(30) Foreign Application Priority Data

May 13, 2022 (JP) ................................ 2022-079684

(51) Int. Cl.
*B60W 50/02* (2012.01)
*B60S 1/52* (2006.01)
(Continued)

(52) U.S. Cl.
CPC . *B60S 1/54* (2013.01); *B60S 1/52* (2013.01); *B60W 50/0205* (2013.01);
(Continued)

(58) Field of Classification Search
CPC ...... B60S 1/54; B60S 1/52; B60S 1/56; B60S 1/62; B60W 50/0205; B60W 60/001;
(Continued)

(56) References Cited

U.S. PATENT DOCUMENTS

2015/0145956 A1 5/2015 Hayakawa et al.
2016/0272165 A1* 9/2016 Hsiao ................ G02B 27/0006
(Continued)

FOREIGN PATENT DOCUMENTS

WO 2019/049381 A1 3/2019

*Primary Examiner* — Daniel M. Robert
(74) *Attorney, Agent, or Firm* — Oliff PLC

(57) ABSTRACT

A sensor cleaning apparatus detects an object in a vicinity of a vehicle from information acquired by at least one sensor monitoring the vehicle vicinity, detects contamination on the sensor, and continues air cleaning in which high-pressure air is sprayed onto the sensor for a predetermined air cleaning time, in response to detecting that water droplets are attached to a sensor surface of the sensor. The sensor cleaning apparatus controls autonomous driving of the vehicle using information on the object detected, and outputs a command to clean the sensor with a cleaning liquid, in response to detecting contamination on the sensor and determining that cleaning with the liquid cleaner is possible. The sensor cleaning apparatus controls at least one liquid cleaning actuator to clean the sensor by spraying the cleaning liquid based on the command, and notifies that the sensor is being cleaned with the cleaning liquid.

12 Claims, 5 Drawing Sheets

(51) Int. Cl.
*B60S 1/54* (2006.01)
*B60W 60/00* (2020.01)

(52) U.S. Cl.
CPC ... *B60W 60/001* (2020.02); *B60W 2050/0215* (2013.01); *B60W 60/005* (2020.02)

(58) Field of Classification Search
CPC ......... B60W 2050/0215; B60W 60/005; G01S 7/481; G01S 17/86; G01S 17/931; G05D 1/0061
See application file for complete search history.

(56) References Cited

U.S. PATENT DOCUMENTS

| | | | | |
|---|---|---|---|---|
| 2019/0283729 | A1 | 9/2019 | Ikebata et al. | |
| 2020/0231125 | A1* | 7/2020 | Wakamiya | G05D 1/0088 |
| 2020/0254981 | A1 | 8/2020 | Takeguchi et al. | |
| 2021/0009088 | A1 | 1/2021 | Hayashi et al. | |
| 2021/0107040 | A1* | 4/2021 | Violetta | B08B 3/041 |
| 2021/0229639 | A1 | 7/2021 | Sato | |
| 2022/0126865 | A1* | 4/2022 | Marcotte | B60W 30/0956 |
| 2022/0126878 | A1* | 4/2022 | Moustafa | B60W 60/0013 |
| 2022/0144218 | A1* | 5/2022 | Bretagnol | B60S 1/56 |
| 2023/0219589 | A1* | 7/2023 | Suh | B60Q 9/00 340/438 |
| 2024/0181999 | A1* | 6/2024 | Suzuki | G01S 13/931 |

* cited by examiner

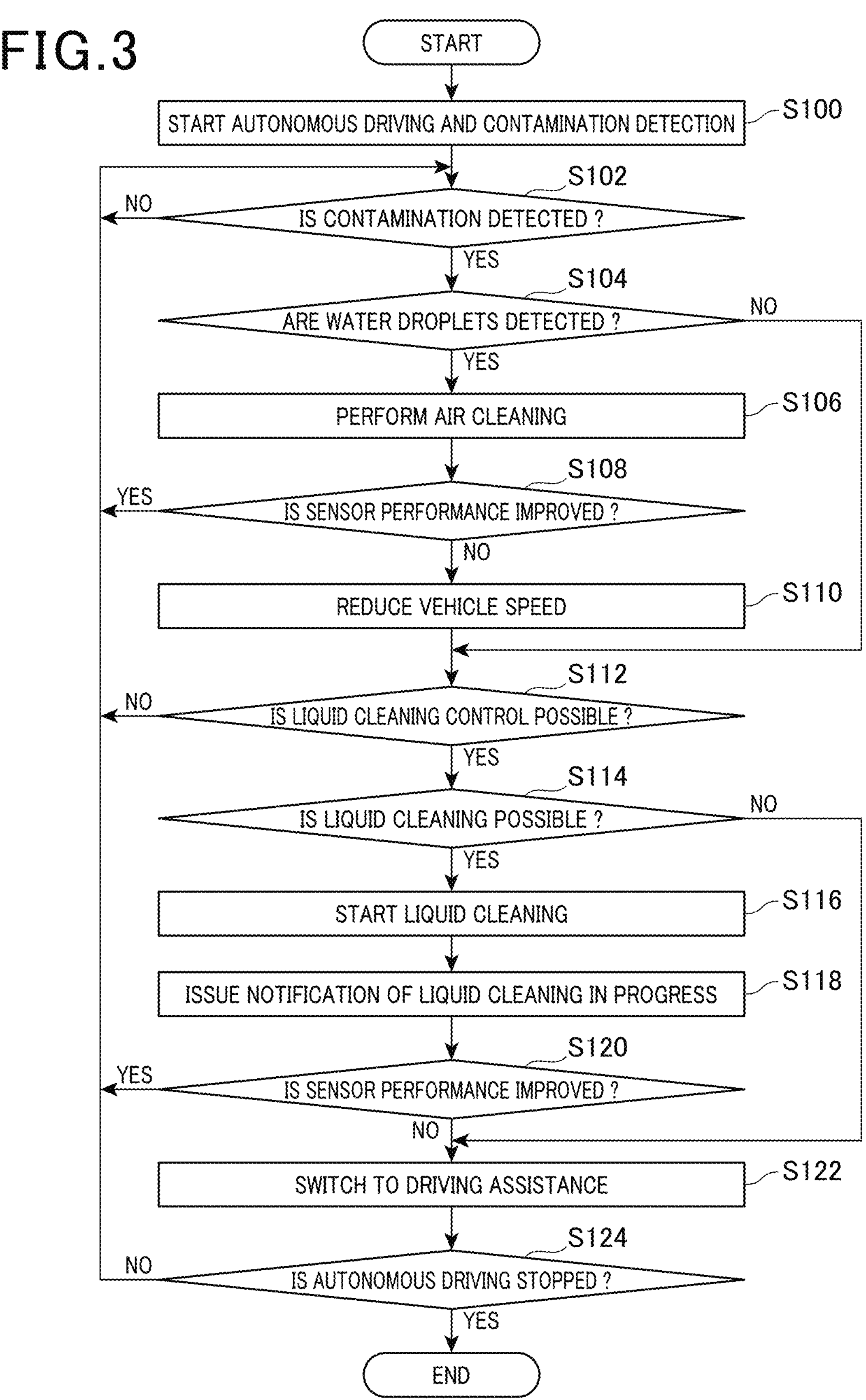
FIG.3
START
START AUTONOMOUS DRIVING AND CONTAMINATION DETECTION
S100
S102
IS CONTAMINATION DETECTED ?
NO
YES
S104
ARE WATER DROPLETS DETECTED ?
NO
YES
PERFORM AIR CLEANING
S106
S108
IS SENSOR PERFORMANCE IMPROVED ?
YES
NO
REDUCE VEHICLE SPEED
S110
S112
IS LIQUID CLEANING CONTROL POSSIBLE ?
NO
YES
S114
IS LIQUID CLEANING POSSIBLE ?
NO
YES
START LIQUID CLEANING
S116
ISSUE NOTIFICATION OF LIQUID CLEANING IN PROGRESS
S118
S120
IS SENSOR PERFORMANCE IMPROVED ?
YES
NO
SWITCH TO DRIVING ASSISTANCE
S122
S124
IS AUTONOMOUS DRIVING STOPPED ?
NO
YES
END

SENSOR CLEANING APPARATUS,SENSOR CLEANING METHOD, AND SENSOR CLEANING PROGRAM

CROSS-REFERENCE TO RELATED APPLICATION

The present application is a continuation application of International Application No. PCT/JP2023/012328, filed on Mar. 27, 2023, which claims priority to Japanese Patent Application Japanese Patent Application No. 2022-079684, filed on May 13, 2022. The contents of these applications are incorporated herein by reference in their entirety.

BACKGROUND

Technical Field

The present disclosure relates to a sensor cleaning apparatus, a sensor cleaning method, and a sensor cleaning program.

Related Art

In autonomous driving (also referred to as a self-driving) of a vehicle, control of acceleration/deceleration, turning, braking, and the like of the vehicle is performed based on image information on a vehicle vicinity acquired by an imaging apparatus such as a camera, and information on an external environment of the vehicle acquired by the vehicle vicinity being scanned by laser light, such as by Light Detection and Ranging (LiDAR).

SUMMARY

On aspect of the present disclosure provides a sensor cleaning apparatus that: detects an object in a vicinity of a vehicle from information acquired by at least one sensor monitoring the vehicle vicinity; detects contamination on the at least one sensor; continues air cleaning in which high-pressure air is sprayed onto the at least one sensor for a predetermined air cleaning time, in response to detecting that water droplets are attached to a sensor surface of the at least one sensor; controls autonomous driving of the vehicle using information on the detected object; and outputs a command to clean the at least one sensor with a cleaning liquid in response to detecting contamination on the at least one sensor and determining that cleaning with the liquid cleaner is possible. The sensor cleaning apparatus controls a liquid cleaning actuator to clean the at least one sensor by spraying the cleaning liquid based on the command, and notifies that the at least one sensor is being cleaned with the cleaning liquid.

BRIEF DESCRIPTION OF THE DRAWINGS

In the accompanying drawings:

FIG. 3 is a flowchart illustrating processes of the sensor cleaning apparatus according to the first embodiment of the present disclosure;

DESCRIPTION OF THE EMBODIMENTS

Figure 1:
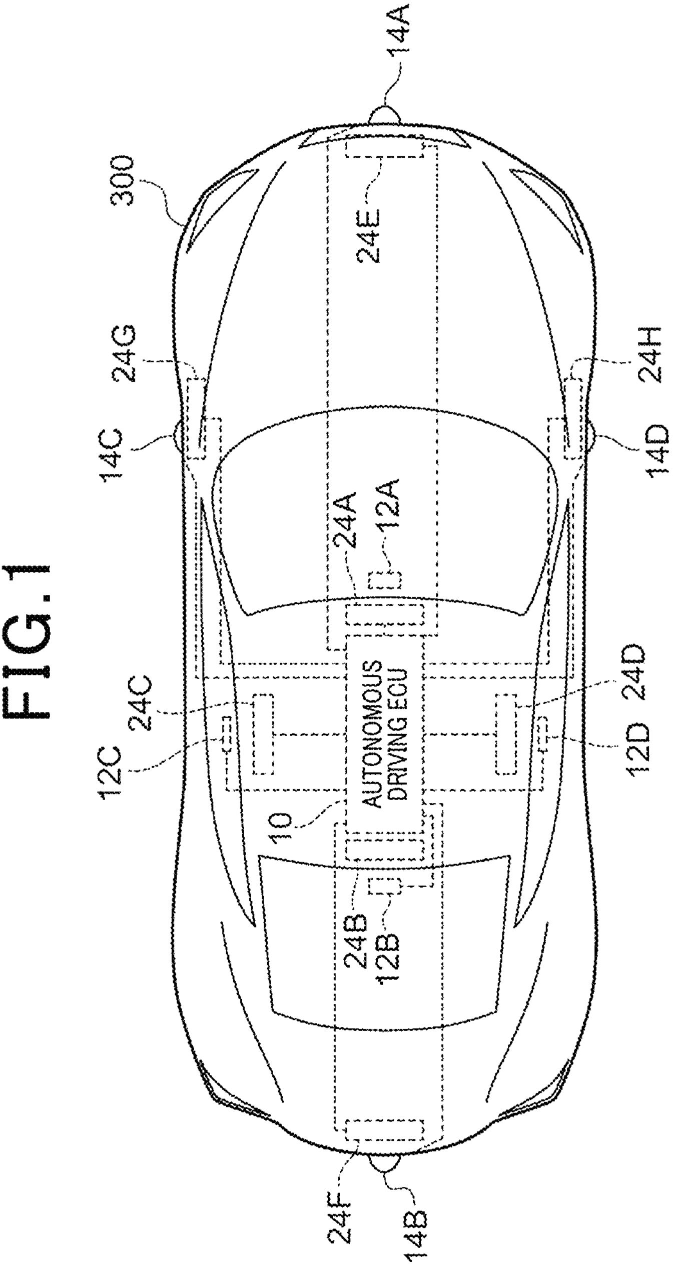
FIG. 1 is a schematic diagram illustrating an arrangement of an autonomous driving electronic control unit (ECU), cameras, LiDARs, and cleaning actuators, according to a first embodiment of the present disclosure.

In sensors such as the imaging apparatus and the LiDAR, if a sensor surface involved in information acquisition regarding the external environment of the vehicle is contaminated, acquiring information on the external environment in a normal manner becomes difficult. In the case of the imaging apparatus, the sensor surface is an imaging lens or a transparent glass protecting the imaging lens. In the case of the LiDAR, the sensor surface is a light emitting unit that emits laser light into the external environment and a light receiving unit that receives laser light reflected by the external environment.

JP 2019-162915 A proposes an invention in which a recognition sensor that recognizes a state of the vicinity of a vehicle is cleaned by high-pressure air or a cleaning liquid.

During cleaning of the recognition sensor, acquiring information on the external environment of the vehicle from the recognition sensor that is being cleaned is difficult. However, in the invention disclosed in JP 2019-162915 A, a recognition sensor to be cleaned is cleaned when, among a plurality of recognition sensors provided in the vehicle, another recognition sensor recognizes an object similar to that recognized by the recognition sensor to be cleaned. However, recognition performance of the recognition sensor does not decrease in the case of air cleaning in which high-pressure air is used. Therefore, the determination to clean the recognition sensor to be cleaned when another recognition sensor recognizes the recognition object similar to that of the recognition sensor to be cleaned is not particularly required.

In addition, in the invention disclosed in JP 2019-162915 A, when liquid cleaning in which the sensor surface is cleaned with the cleaning liquid is performed, in order to prevent the cleaning liquid from being erroneously determined to be contamination, a notification indicating "liquid cleaning in progress" is required to be issued to a control apparatus that detects contamination on the sensor surface. However, this notification is not performed in the invention disclosed in JP 2019-162915 A, the cleaning liquid attached to the sensor surface may be erroneously determined to be contamination.

It is thus desired to provide a sensor cleaning apparatus that selectively uses air cleaning and liquid cleaning in an appropriate manner, and suppresses effects of liquid cleaning on autonomous driving, a sensor cleaning method, and a sensor cleaning program.

One exemplary embodiment of the present disclosure provides a sensor cleaning apparatus that includes: an object detection unit that detects an object in a vicinity of a vehicle from information acquired by at least one sensor monitoring the vehicle vicinity; a contamination detection unit that detects contamination on the at least one sensor; a cleaning control unit that continues air cleaning in which high-pressure air is sprayed onto the sensor for a predetermined air cleaning time; and an autonomous driving control unit that controls autonomous driving of the vehicle using information on the object detected by the object detection unit, and outputs a command to the cleaning control unit to clean the at least one sensor with a cleaning liquid in response to the contamination detection unit detecting contamination on the sensor and determining that cleaning with the liquid cleaner is possible. The cleaning control unit controls a liquid cleaning actuator to clean the at least one sensor by spraying the cleaning liquid based on the command, and notifies the autonomous driving control unit that the at least one sensor is being cleaned with the cleaning liquid.

As a result of a configuration such as this, a sensor cleaning apparatus that selectively uses air cleaning and liquid cleaning in an appropriate manner and suppresses effects of liquid cleaning on autonomous driving, a sensor cleaning method, and a sensor cleaning program can be achieved.

The above exemplary embodiments of the present disclosure will be further clarified through the detailed description below, with reference to the accompanying drawings.

First Embodiment

A first embodiment of the present disclosure will hereinafter be described with reference to the drawings. FIG. 1 shows an arrangement of an autonomous driving electronic control unit (ECU), cameras, LiDARs, and cleaning actuators, according to a first embodiment of the present disclosure. The autonomous driving ECU controls autonomous driving of a vehicle; the cameras are sensors that acquire information on an external environment of the vehicle required for autonomous driving; the LiDARs are sensors that similarly acquire information on the external environment of the vehicle required for autonomous driving; and the cleaning actuators respectively clean the cameras and the LiDARs Specifically, FIG. 1 shows an arrangement of an autonomous driving electronic control unit (ECU) 10 that controls autonomous driving of a vehicle 300, cameras 12A, 12B, 12C, and 12D that are sensors that acquire information on an external environment of the vehicle 300 required for autonomous driving, LiDARs 14A, 14B, 14C, and 14D that are sensors that similarly acquire information on the external environment of the vehicle 300 required for autonomous driving, cleaning actuators 24A, 24B, 24C, and 24D that respectively clean the cameras 12A, 12B, 12C, and 12D, and cleaning actuators 24E, 24F, 24G, and 24H that respectively clean the LiDARs 14A, 14B, 14C, and 14D. For example, the autonomous driving ECU 10 may be configured to include a central processing unit (CPU), a rewritable non-volatile memory, and the like. The non-volatile memory stores therein a program indicating processes of a sensor cleaning apparatus 100 described hereafter. The CPU reads and runs the program.

As shown in FIG. 1, the camera 12A is provided in an upper portion of a front windshield or the like of the vehicle 300, and acquires images of an area ahead of the vehicle 300. The camera 12B is provided in an upper portion of a rear windshield or the like of the vehicle 300, and acquires images of an area behind the vehicle 300. The camera 12C is provided on a left side surface of the vehicle 300 and acquires images of the left side surface of the vehicle 300. In addition, the camera 12D is provided on a right side surface of the vehicle 300 and acquires images of the right side surface of the vehicle 300.

The LiDARs 14A, 14B, 14C, and 14D are each configured to be capable of measuring scattered light in relation to laser light irradiation that is irradiated in pulses into the external environment of the vehicle 300, and analyzing a distance to a target that is a long distance away and properties of the target. As shown in FIG. 1, the LiDAR 14A is provided in a front bumper or the like of the vehicle 300, and acquires information on the area ahead of the vehicle 300. The LiDAR 14B is provided in a rear bumper or the like of the vehicle 300, and acquires information on the area behind the vehicle 300. The LiDAR 14C is provided on the left side surface of the vehicle 300 and acquires information on the left side surface of the vehicle 300. In addition, the LiDAR 14D is provided on the right side surface of the vehicle and acquires information on the right side surface of the vehicle 300.

The cleaning actuators 24A, 24B, 24C, and 24D perform air cleaning in which high-pressure air is sprayed or liquid cleaning in which a cleaning liquid is sprayed on each of the cameras 12A, 12B, 12C, and 12D, under control of the autonomous driving ECU 10. In addition, the cleaning actuators 24E, 24F, 24G, and 24H perform air cleaning or liquid cleaning on each of the LiDARs 14A, 14B, 14C, and 14D, under control of the autonomous driving ECU 10. In addition to air cleaning and liquid cleaning, each of the cleaning actuators 24A to 24H may also perform gas-liquid mixed-phase cleaning in which the high-pressure air and the cleaning liquid are sprayed onto each of the cameras 12A to 12D and the LiDAR 14A to 14D.

Figure 2:
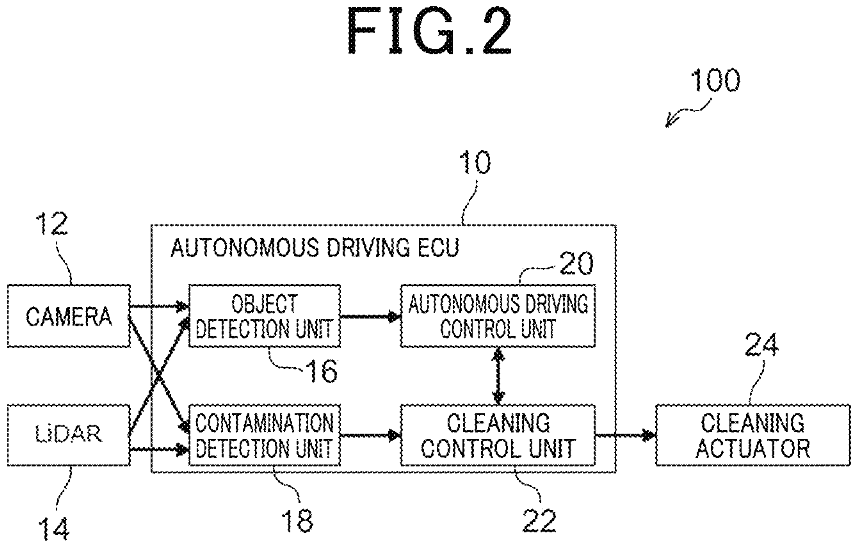
FIG. 2 is a block diagram illustrating a configuration of a sensor cleaning apparatus according to the first embodiment of the present disclosure.

FIG. 2 is a block diagram of an example of a configuration of the sensor cleaning apparatus 100 according to the present embodiment. As shown in FIG. 1, a plurality of cameras 12 (12A to 12D), LiDARs 14 (14A to 14D), and cleaning actuators 24 (24A to 24H) are connected to the autonomous driving ECU 10. The cleaning actuators 24 are apparatuses that clean the cameras 12 and LiDARs 14 that are sensors using any of "air," "liquid," and "mixed-phase air-liquid" cleaning means.

As shown in FIG. 2, the autonomous driving ECU 10 includes an object detection unit 16 that detects an object in the vicinity of the vehicle 300 based on the information acquired by the cameras 12 and the LiDARs 14, and an autonomous driving control unit 20 that controls autonomous driving of the vehicle 300 based on a detection result from the object detection unit 16.

In addition, the autonomous driving ECU 10 includes a contamination detection unit 18 that detects contamination attached to a sensor surface of each camera 12 and LiDAR 14, and a cleaning control unit 22 that controls the cleaning actuators 24 based on detection results from the contamination detection unit 18. When the cleaning control unit 22 operates the cleaning actuator 24 and cleans the sensor surface of the camera 12 or the LiDAR 14, the autonomous driving control unit 20 is notified of which of the cameras 12A to 12D or LiDARs 14A to 14D the sensor to be cleaned is. The autonomous driving control unit 20 is prevented from recognizing the cleaning liquid attached to the sensor surface of the sensor to be cleaned as contamination. As described above, the sensor surface is an imaging lens or a transparent glass protecting the imaging lens in the case of the camera 12, and is a light emitting unit that irradiates laser light into the external environment and a light receiving unit that receives the laser light reflected by the external environment in the case of the LiDAR 14.

FIG. 3 is a flowchart of an example of processes of the sensor cleaning apparatus 100 according to the present embodiment. The processes shown in FIG. 3 are performed by the autonomous driving ECU 10. For example, the autonomous driving ECU 10 may be configured to include a CPU, a rewritable non-volatile memory, and the like. The non-volatile memory stores therein a program indicating the processes shown in FIG. 3. The CPU reads and runs the program stored in the non-volatile memory. As indicated at step S100, the processes shown in FIG. 3 are started together with autonomous driving of the vehicle 300, and autonomous driving and contamination detection regarding the sensor are simultaneously started.

At step S102, the contamination detection unit 18 determines whether contamination on the sensor surface is detected. Regarding contamination on the sensor surface, when the sensor is the camera 12, presence/absence of contamination on the sensor surface is determined from image data acquired by the camera 12. In addition, when the sensor is the LiDAR 14, contamination is determined to be attached to the sensor surface when a light amount of laser light (received light) reflected by the external environment of the vehicle 300 is equal to or less than a first light amount threshold.

Figure 4:
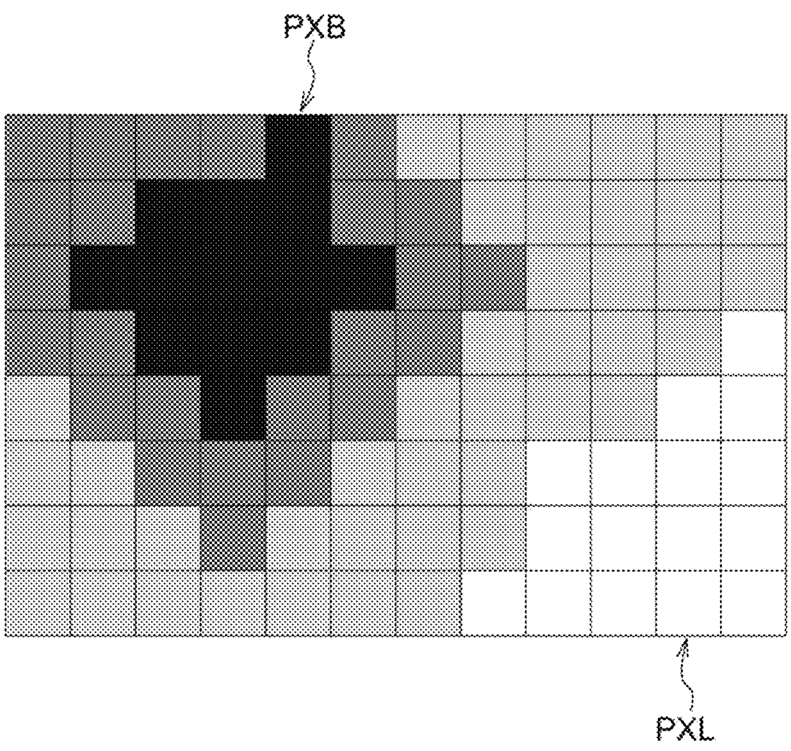
FIG. 4 is an enlarged view of image data acquired by the camera when foreign matters such as contamination are attached to a sensor surface.

FIG. 4 is an example of an enlarged view of the image data acquired by the camera 12 when foreign matters such as contamination are attached to the sensor surface. Each square in FIG. 4 is a pixel configuring the image data. When foreign matters such as contamination are not present on the sensor surface of the camera 12, a luminance (pixel value) that is close to white is indicated as in pixel PXL. However, when contamination is present on the sensor surface, a pixel value close to black is indicated as in pixel PXB.

Figure 5:
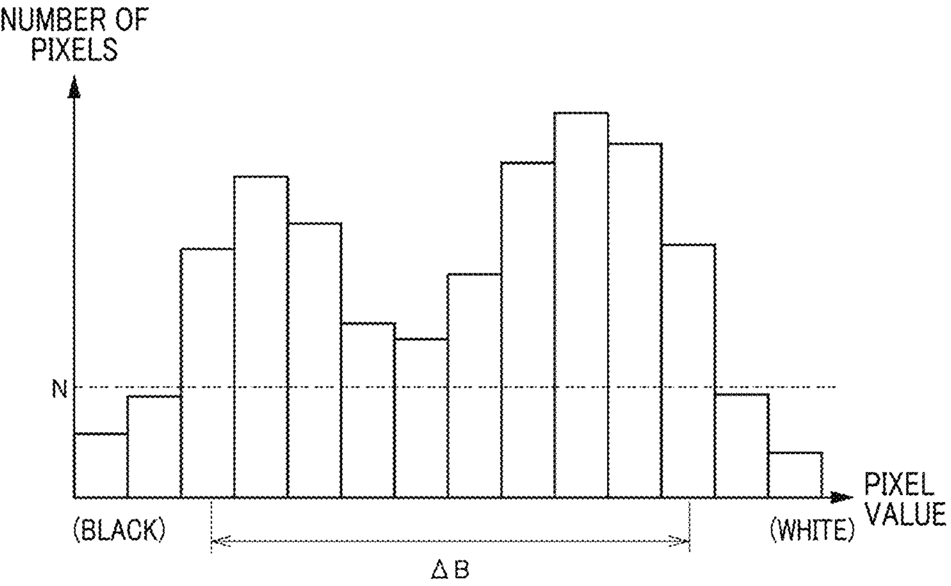
FIG. 5 is a histogram illustrating the image data shown in FIG. 4.

FIG. 5 is an example of a histogram of the image data shown in FIG. 4. In FIG. 5, the pixel value is set on a horizontal axis and a number of pixels is set on a vertical axis. According to the present embodiment, when a luminance difference AB that is a difference between a maximum value and a minimum value of the pixel values of pixels of which a predetermined number of pixels N or more are present is equal to or greater than a predetermined first luminance difference threshold, foreign matters such as contamination are determined to be present on the sensor surface. Pixels that are less than the predetermined number of pixels N may be noise generated in the image data. Therefore, these pixels are not used in the determination of the maximum value and the minimum value of the pixel values. The predetermined number of pixels N differs depending on specifications of the camera 12 and the like. However, as an example, N=2m (m=2 to 4).

When foreign matters such as contamination are determined to be present on the sensor surface at step S102, the process transitions to step S104. When foreign matters such as contamination are determined to not be present on the sensor surface at step S102, contamination detection by the contamination detection unit 18 is continued.

At step S104, the contamination detection unit 18 determines whether the foreign matters attached to the sensor surface are water droplets. Regarding the water droplets, when the sensor is the camera 12, water droplets are determined to be attached to the sensor surface when the luminance difference AB shown in FIG. 5 is less than a second luminance difference threshold that is greater than the predetermined first luminance difference threshold. In other words, when the luminance difference AB is equal to or greater than the predetermined second luminance difference threshold, contamination that is not water droplets can be determined to be attached to the sensor surface of the camera 12. For example, the predetermined first luminance difference threshold and the predetermined second luminance difference threshold may be each specifically determined based on image information acquired in a state in which contamination or water droplets are attached to the sensor surface of the camera 12.

When the sensor is the LiDAR 14, water droplets are determined to be attached to the sensor surface when the light amount of the laser light reflected by the external environment of the vehicle is greater than a predetermined second light amount threshold that is less than the predetermined first light amount threshold. In other words, when the light amount of the laser light reflected by the external environment of the vehicle is equal to or less than the predetermined second light amount threshold, contamination that is not water droplets can be determined to be attached to the sensor surface of the LiDAR 14. For example, the predetermined first light amount threshold and the predetermined second light amount threshold may be each specifically determined based on changes in the light amount received in a state in which contamination or a water droplet is attached to the sensor surface of the LiDAR 14.

At step S104, the process transitions to step S106 when the water droplet is detected on the sensor surface, and the process transitions to step S112 when the water droplets are not detected on the sensor surface, that is, contamination other than water droplets is thought to be attached to the sensor surface.

At step S106, the cleaning control unit 22 controls the cleaning actuator 24 and performs air cleaning in which high-pressure air is sprayed onto the sensor surface of the sensor on which the water droplets are determined to be attached for a predetermined amount of time. According to the present embodiment, contamination detection regarding the sensor surface is performed even during air cleaning at step S106. In addition, a spray pressure and a spray amount of the high-pressure air, and the predetermined amount of time of air cleaning at step S106 are specifically determined through an experiment for removing water droplets and the like in a state in which the water droplets are actually attached to the sensor surface. Alternatively, air cleaning is continued until determination of presence/absence of improvement in sensor performance at step S108, described hereafter. When improvement in sensor performance is not seen at step S108, control to discontinue air cleaning may be performed.

At step S108, the object detection unit 16 and the autonomous driving control unit 20 determine whether sensor performance is improved. Specifically, when the sensor is the camera 12, the sensor performance is determined to be improved when the luminance difference ΔB shown in FIG. 5 is less than the predetermined first luminance difference threshold. In addition, when the sensor is the LiDAR 14, the sensor performance is determined to be improved when the light amount of the laser light reflected by the external environment of the vehicle is greater than the predetermined first light amount threshold.

At step S108, the process transitions to step S102 when the sensor performance is improved and the process transitions to step S110 when the sensor performance is not improved.

At step S110, the autonomous driving control unit 20 reduces a vehicle speed of the vehicle 300. An extent to which the vehicle speed is reduced is influenced by a speed limit of a traveling lane and the like, but is, as an example, 10 to 15 km/h.

At step S112, the autonomous driving control unit 20 determines whether liquid cleaning control is possible. Specifically, liquid cleaning control is determined to be possible based on whether object detection for autonomous driving is not hindered by the sensor to be cleaned being covered by the cleaning liquid, and in a case in which a predetermined target, such as a pedestrian or a bicycle, that is not to come into contact with the cleaning liquid is not present in the vicinity of the vehicle 300.

More specifically, the case is such that the object detection unit 16 does not detect a pedestrian or a bicycle (an object that is set in advance as an object that is not to come into contact with the cleaning liquid) within a predetermined range in the vicinity of the vehicle 300 immediately before liquid cleaning. The predetermined range is specifically determined based on a spray pressure, a spray amount, and the like of the cleaning liquid of the cleaning actuator 24. In addition, a case in which object detection for autonomous driving is not hindered even if the sensor to be cleaned is covered by the cleaning liquid may be, for example, a case in which the contamination detected by the contamination detection unit 18 is minimal and easily removed by the spraying of the cleaning liquid, or a case in which only a portion of the sensors among the cameras 12A to 12D and the LiDARs 14A to 14D that are the plurality of provided sensors is to be cleaned, and the sensors other than the sensors to be cleaned are functioning in a normal manner.

The case in which the contamination detected by the contamination detection unit 18 is minimal and can be easily removed by the spraying of the cleaning liquid is, for example, a case in which, in the contamination detection unit 18, the luminance difference ΔB shown in FIG. 5 is substantially equal to the predetermined first luminance difference threshold when the sensor is the camera 12, and the light amount of the laser light reflected by the external environment of the vehicle 300 is substantially equal to the predetermined first light amount threshold when the sensor is the LiDAR 14.

At step S112, a command to clean the sensor with the cleaning liquid is outputted to the cleaning control unit 22 and the process transitions to step S114 when liquid cleaning control is possible. The process transitions to step S102 when liquid cleaning control is not possible.

At step S114, the cleaning control unit 22 determines whether liquid cleaning is possible. Specifically, the cleaning control unit 22 makes a determination of No when liquid cleaning cannot be performed due to limitations on the cleaning actuator 24 side and makes a determination of YES when liquid cleaning can be performed. Limitations on the cleaning actuator 24 side at step S114 may be, for example, when, in a case in which a plurality of sensors are to be cleaned, the plurality of sensors cannot be simultaneously liquid-cleaned due to limitations of a pump that pumps out the cleaning liquid and, therefore, a sensor that is forced to await cleaning occurs or cleaning itself cannot be performed due to insufficient cleaning liquid. When liquid cleaning is possible at step S114, the process transitions to step S116. When liquid cleaning is not possible, the process transitions to step S122.

At step S116, the cleaning control unit 22 controls the cleaning actuator 24 and performs liquid cleaning in which the cleaning liquid is sprayed onto the sensor surface of the sensor to be cleaned for a predetermined amount of time. According to the present embodiment, contamination detection regarding the sensor surface is performed even during the liquid cleaning at step S116. In addition, the spray pressure and the spray amount of the cleaning liquid, and the predetermined amount of time of liquid cleaning at step S116 are specifically determined through an experiment for removing contamination and the like in a state in which contamination is actually attached to the sensor surface.

At step S118, the cleaning control unit 22 issues a notification that liquid cleaning of the sensor to be cleaned is in progress. The notification is issued because, in addition to the risk of sensor detection being affected by the sensor surface being covered with the cleaning liquid due to liquid cleaning, the cleaning liquid is dispersed in the vicinity of the vehicle 300. Meanwhile, air cleaning does not directly affect detection by the sensor or objects present in the vicinity of the vehicle 300 due to cleaning. Therefore, the cleaning control unit 22 is not required to notify the autonomous driving control unit 20 that cleaning is in progress for air cleaning.

At step S120, the object detection unit 16 and the autonomous driving control unit 20 determine whether sensor performance is improved. Specifically, when the sensor is the camera 12, sensor performance is determined to have improved if the luminance difference AB shown in FIG. 5 is less than the predetermined first luminance difference threshold. In addition, when the sensor is the LiDAR 14, sensor performance is determined to have improved if the light amount of laser light reflected by the external environment of the vehicle is greater than the predetermined light amount first threshold.

When the sensor performance is improved at step S120, the process transitions to step S102. Contamination detection regarding the sensor surface is resumed. When the sensor performance is not improved, the process transitions to step S122.

At step S122, the autonomous driving control unit 20 switches from autonomous driving to driving assistance. Specifically, this is a warning display regarding an obstacle detected by the object detection unit 16, a lane deviation warning, or the like. Alternatively, further measures such as reduction of vehicle speed, reduction of autonomous driving level such as prohibition of autonomous lane change, or discontinuation of autonomous driving may be performed. Implementation of measures such as the reduction of vehicle speed, the reduction of autonomous driving level such as prohibition of lane change, or the discontinuation of autonomous driving differs depending on a position of the sensor from which contamination cannot be removed.

For example, in cases in which the contamination on the sensor surface of the camera 12A or the LiDAR 14A that acquires information on the area ahead of the vehicle 300 cannot be removed, a measure to stop autonomous driving is implemented because the effect on autonomous driving is great. In addition, in cases in which the contamination on the sensor surface of the camera 12B or the LiDAR 14B that acquires information on the area behind the vehicle 300 cannot be removed, for example, a measure to reduce the autonomous driving level, such as prohibit lane change, is implemented. Furthermore, in cases in which the contamination on the sensor surface of the cameras 12C and 12D or the LiDAR 14C and 14D that acquires information on the side surface of the vehicle 300 cannot be removed, for example, a measure such as reducing vehicle speed is implemented.

At step S124, the autonomous driving control unit 20 determines whether autonomous driving is stopped by the driver. When autonomous driving is stopped at step S124, the autonomous driving control unit 20 outputs a command to discontinue cleaning with the cleaning liquid to the cleaning control unit 22 and ends the series of processes including liquid cleaning shown in FIG. 3. Even when liquid cleaning is ended, air cleaning may be continued. When autonomous driving is not stopped at step S124, the process transitions to step S102 and contamination detection regarding the sensor surface is resumed.

As described above, according to the present embodiment, as a result of air cleaning and liquid cleaning being selectively used in an appropriate manner, contamination on a sensor surface can be effectively removed. In addition, according to the present embodiment, as a result of liquid cleaning being performed when the object detection unit 16 does not detect a pedestrian or a bicycle within a predetermined range in the vicinity of the vehicle 300 immediately before cleaning, sensor cleaning that takes into consideration a surrounding area can be performed.

Furthermore, according to the present embodiment, in cases in which the contamination detected by the contamination detection unit 18 is slight and can be easily removed by spraying of the cleaning liquid, or in cases in which, among the cameras 12A to 12D and the LiDARs 14A to 14D that are a plurality of provided sensors, only a portion of the sensors are to be cleaned and the sensors other than the sensors to be cleaned are functioning in a normal manner, liquid cleaning is performed. In addition, as a result of the cleaning control unit 22 notifying the autonomous driving control unit 20 that cleaning of the sensor is in progress, the effects on object detection for autonomous driving can be suppressed even if the sensor to be cleaned is covered with the cleaning liquid.

Second Embodiment

Figure 6:
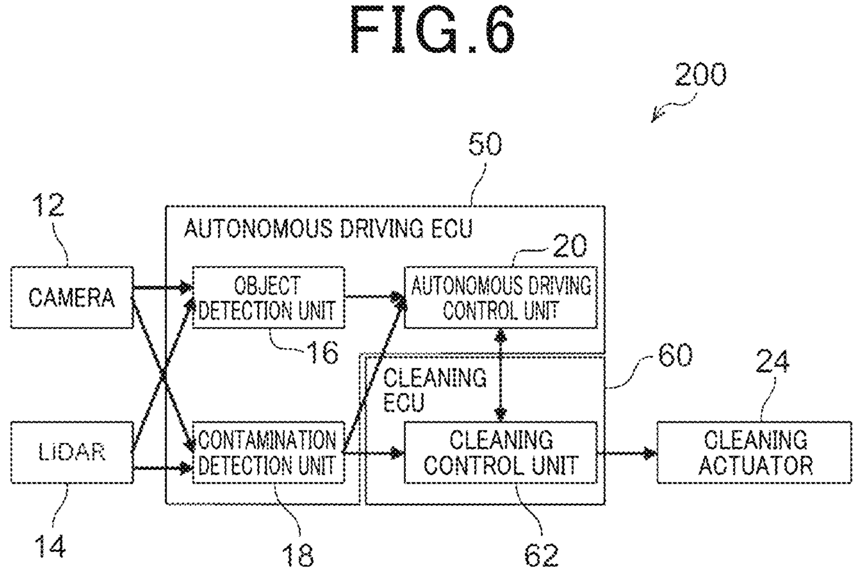
FIG. 6 is a block diagram illustrating a configuration of a sensor cleaning apparatus according to a second embodiment of the present disclosure.

Next, a second embodiment of the present disclosure will be described. FIG. 6 is a block diagram of an example of a configuration of a sensor cleaning apparatus 200 according to the present embodiment. The present embodiment differs from the first embodiment in that a cleaning ECU 60 that includes a cleaning control unit 62 is a circuit independent from the autonomous driving ECU 50 and the contamination detection unit 18 outputs information on the detected contamination on the sensor surface not only to the cleaning control unit 62 but also to the autonomous driving control unit 20. However, other configurations are identical to those according to the first embodiment. Configurations identical to those according to the first embodiment are given the same reference numbers as those according to the first embodiment. Detailed descriptions thereof are omitted.

According to the present embodiment, as shown in FIG. 6, the autonomous driving control unit 20 is capable of quickly determining the sensor to be cleaned and the extent to which object detection is affected when the sensor to be cleaned is liquid-cleaned, by receiving information on contamination on the sensor surface from the contamination detection unit 18.

In addition, transition to control such as reducing the autonomous driving level or stopping autonomous driving can be promptly performed in cases in which the contamination on the sensor surface cannot be removed even by liquid cleaning.

Third Embodiment

Figure 7:
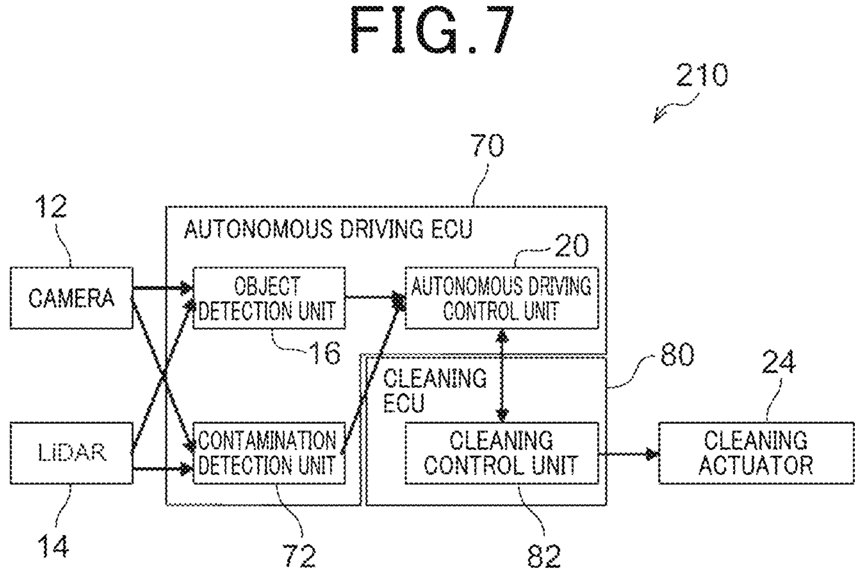
FIG. 7 is a block diagram illustrating a configuration of a sensor cleaning apparatus according to a third embodiment of the present disclosure.

Next, a third embodiment of the present disclosure will be described. FIG. 7 is a block diagram of an example of a configuration of a sensor cleaning apparatus 210 according to the present embodiment. The present embodiment differs from the second embodiment in that the contamination detection unit 18 outputs the information on the detected contamination on the sensor surface to the autonomous driving control unit 20 but not to a cleaning control unit 82 of a cleaning ECU 80. Other configurations are identical to those according to the second embodiment. Therefore, configurations identical to those according to the second embodiment are given the same reference numbers as those according to the second embodiment. Detailed descriptions are omitted.

According to the present embodiment, the information on object detection by the object detection unit 16 and the information on contamination on the sensor surface by the contamination detection unit 18 being outputted to the autonomous driving control unit 20 in a concentrated manner contributes to the autonomous driving control unit 20 comprehensively performing control of autonomous driving of the vehicle 300 and cleaning of the sensor surface, and suppressing the effects of liquid cleaning on autonomous driving.

Here, according to the present embodiment, a mode in which the program is stored in advance (installed) in a non-volatile memory is described. However, this is not limited thereto. The program may be provided in a mode in which the program is stored in a non-transitory storage medium such as a Compact Disk Read Only Memory (CD-ROM), a Digital Versatile Disk Read Only Memory (DVD-ROM), a Universal Serial Bus (USB) memory, or a semiconductor memory. In addition, a mode in which the above-described programs are downloaded from an external apparatus over a network is also possible.

While the present disclosure has been described with reference to embodiments thereof, it is to be understood that the disclosure is not limited to the embodiments and constructions. The present disclosure is intended to cover various modification examples and modifications within the range of equivalency. In addition, various combinations and configurations, and further, other combinations and configurations including more, less, or only a single element thereof are also within the spirit and scope of the present disclosure.

Additional notes related to the present disclosure are described below.

(Additional Note 1)

A sensor cleaning apparatus including: an object detection unit that detects an object in a vicinity of a vehicle from information acquired by at least one sensor monitoring the vehicle vicinity; a contamination detection unit that detects contamination on the at least one sensor; a cleaning control unit that continues air cleaning in which high-pressure air is sprayed onto the at least one sensor for a predetermined air cleaning time, in response to the contamination detection unit detecting that water droplets are attached to a sensor surface of the at least one sensor; and an autonomous driving control unit that controls autonomous driving of the vehicle using information on the object detected by the object detection unit, and outputs a command to the cleaning control unit to clean the at least one sensor with a cleaning liquid in response to the contamination detection unit detecting contamination on the plurality of sensors and determines that cleaning with the liquid cleaner is possible, in which the cleaning control unit controls a liquid cleaning actuator to clean the at least one sensor by spraying the cleaning liquid based on the command, and notifies the autonomous driving control unit that the at least one is being cleaned with the cleaning liquid.

(Additional Note 2)

The sensor cleaning apparatus according to additional note 1, in which the at least one sensor is a plurality of sensors, and the autonomous driving control unit outputs a command to the cleaning control unit to clean a target sensor to be cleaned with the cleaning liquid, in response to determination that at least one sensor among the plurality of sensors is the target sensor to be cleaned and at least one sensor among the plurality of sensors other than the target sensor to be cleaned is functioning in a normal manner.

(Additional Note 3)

The sensor cleaning apparatus according to additional note 1 or 2, in which the autonomous driving control unit discontinues cleaning of the at least sensor with the cleaning liquid in response to the object detection unit detecting a predetermined object that is not to come into contact with the cleaning liquid within a certain range from the at least one sensor, in response to the at least one sensor being cleaned with the cleaning liquid.

(Additional Note 4)

The sensor cleaning apparatus according to any one of additional notes 1 to 3, in which the cleaning control unit continues spraying of the cleaning liquid onto the at least one sensor for a predetermined liquid cleaning time, and the autonomous driving control unit performs any control of restricting vehicle speed in autonomous driving, reducing autonomous driving level, and discontinuing autonomous driving, in response to the contamination detection unit detecting contamination on the at least sensor even after spraying of the cleaning liquid is continued for the predetermined liquid cleaning time.

(Additional Note 5)

The sensor cleaning apparatus according to additional note 4, in which the autonomous driving control unit reduces the autonomous driving level by switching autonomous driving to driving assistance in response to the contamination detection unit detecting contamination on the at least one sensor even after spraying of the cleaning liquid is continued for the predetermined liquid cleaning time.

(Additional Note 6)

The sensor cleaning apparatus according to additional note 4, in which the autonomous driving control unit outputs a command to the cleaning control unit to discontinue cleaning of the at least one sensor with the cleaning liquid in response to autonomous driving being discontinued.

(Additional Note 7)

The sensor cleaning apparatus according to any one of additional notes 4 to 6, in which the autonomous driving control unit does not recognize the cleaning liquid attached to the at least one sensor as contamination during the predetermined liquid cleaning time.

(Additional Note 8)

The sensor cleaning apparatus according to any one of additional notes 1 to 7, in which the cleaning control unit does not notify the autonomous driving control unit that the at least one sensor is being cleaned when the sensor is air-cleaned.

(Additional Note 9)

The sensor cleaning apparatus according to any one of additional notes 1 to 8, in which the autonomous driving control unit interrupts air cleaning and outputs a command to the cleaning control unit to clean with the cleaning liquid in response to detection function of the at least one sensor not being improved after air cleaning is continued for the predetermined air cleaning time.

(Additional Note 10)

A sensor cleaning method including: detecting an object in a vehicle vicinity from information acquired by at least one sensor that monitors the vehicle vicinity; controlling autonomous driving of the vehicle using information on the detected object; detecting contamination on the at least one sensor; continuing air cleaning in which high-pressure air is sprayed onto the at least one sensor for a predetermined air cleaning time, in response to detecting that water droplets are attached to a sensor surface of the at least sensor; controlling a liquid cleaning actuator to clean the at least one sensor by spraying a cleaning liquid, in response to the contamination on the at least one sensor being detected and capable of being cleaned with the cleaning liquid.

(Additional Note 11)

A non-transitory computer-readable program storing therein a sensor cleaning program for causing a computer to implement: detecting an object in a vehicle vicinity from information acquired by at least one sensor that monitors the vehicle vicinity; detecting contamination on the sensor; controlling an air cleaning actuator and continues air cleaning in which high-pressure air is sprayed onto the at least one sensor for a predetermined air cleaning time, in response to detecting that water droplets are attached to a sensor surface of the sensor; controlling autonomous driving of the vehicle using the information on the object detected and outputting a command to clean the at least one sensor with a cleaning liquid, in response to detecting contamination on the at least one sensor and determining that cleaning with the cleaning liquid is possible; and controlling at least one liquid cleaning actuator to clean the at least one sensor by spraying with the cleaning liquid based on the command, and notifying that the at least one sensor is being cleaned with the cleaning liquid.

What is claimed is:

1. A sensor cleaning apparatus comprising:

an object detection unit that detects an object in a vicinity of a vehicle from information acquired by at least one sensor monitoring the vehicle vicinity;

a contamination detection unit that detects contamination on the at least one sensor;

a cleaning control unit that continues air cleaning in which high-pressure air is sprayed onto the at least one sensor for a predetermined air cleaning time, in response to the contamination detection unit detecting that water droplets are attached to a sensor surface of the at least one sensor; and an autonomous driving control unit that controls autonomous driving of the vehicle using information on the object detected by the object detection unit, and outputs a command to the cleaning control unit to clean the at least one sensor with a cleaning liquid when the contamination detection unit detects contamination on the at least one sensor and determines that cleaning with the liquid cleaner is possible, wherein the cleaning control unit controls at least one liquid cleaning actuator to clean the at last one sensor by spraying the cleaning liquid based on the command, and notifies the autonomous driving control unit that the at least one sensor is being cleaned with the cleaning liquid, the cleaning control unit continues spraying of the cleaning liquid onto the sensor for a predetermined liquid cleaning time, and the autonomous driving control unit performs restricting vehicle speed in autonomous driving, or reducing autonomous driving level, or discontinuing autonomous driving, in response to the contamination detection unit detecting contamination on the sensor after spraying of the cleaning liquid is continued for the predetermined liquid cleaning time.

2. The sensor cleaning apparatus according to claim 1, wherein:

the at least one sensor comprises a plurality of sensors; and the autonomous driving control unit outputs a command to the cleaning control unit to clean a target sensor to be cleaned with the cleaning liquid, in response to determination that at least one sensor among the plurality of sensors is the target sensor to be cleaned and at least one sensor other than the target sensor to be cleaned, among the plurality of sensors, is functioning in a normal manner.

3. The sensor cleaning apparatus according to claim 1, wherein:

the autonomous driving control unit discontinues cleaning of the sensor with the cleaning liquid in response to the object detection unit detecting a predetermined object that is not to come into contact with the cleaning liquid within a certain range from the sensor, in response to the sensor being cleaned with the cleaning liquid.

4. The sensor cleaning apparatus according to claim 1, wherein:

the autonomous driving control unit reduces the autonomous driving level by switching autonomous driving to driving assistance in response to the contamination detection unit detecting contamination on the sensor after spraying of the cleaning liquid is continued for the predetermined liquid cleaning time.

5. The sensor cleaning apparatus according to claim 1, wherein:

the autonomous driving control unit outputs a command to the cleaning control unit to discontinue cleaning of the sensor with the cleaning liquid in response to autonomous driving being discontinued.

6. The sensor cleaning apparatus according to claim 5, wherein:

the autonomous driving control unit does not recognize the cleaning liquid attached to the sensor as contamination during the predetermined liquid cleaning time.

7. The sensor cleaning apparatus according to claim 1, wherein:

the cleaning control unit does not notify the autonomous driving control unit that the sensor is being cleaned in response to the sensor being air-cleaned.

8. The sensor cleaning apparatus according to claim 1, wherein:

the autonomous driving control unit interrupts air cleaning and outputs a command to the cleaning control unit to clean with the cleaning liquid in response to detection function of the sensor not being improved after air cleaning is continued for the predetermined air cleaning time.

9. A sensor cleaning method comprising:

detecting an object in a vehicle vicinity from information acquired by a sensor that monitors the vehicle vicinity;

controlling autonomous driving of the vehicle using information on the detected object;

detecting contamination on the sensor;

continuing air cleaning in which high-pressure air is sprayed onto the sensor for a predetermined air cleaning time, in response to detecting that water droplets are attached to a sensor surface of the sensor; and controlling a liquid cleaning actuator to clean the sensor by spraying a cleaning liquid, in response to the contamination on the sensor being detected and capable of being cleaned with the cleaning liquid;

continuing spraying of the cleaning liquid onto the sensor for a predetermined liquid cleaning time, and performing restricting vehicle speed in autonomous driving, or reducing autonomous driving level, or discontinuing autonomous driving, in response to the detecting contamination on the sensor after spraying of the cleaning liquid is continued for the predetermined liquid cleaning time.

10. A non-transitory computer-readable storage medium storing a sensor cleaning program for causing a computer to implement:

detecting an object in a vehicle vicinity from information acquired by a sensor that monitors the vehicle vicinity;

detecting contamination on the sensor;

controlling an air cleaning actuator and continuing air cleaning in which high-pressure air is sprayed onto the sensor for a predetermined air cleaning time, in response to detecting contamination on the sensor, in response to detecting that water droplets are attached to a sensor surface of the sensor;

controlling autonomous driving of the vehicle using the information on the object detected and outputs a command to clean the sensor with a cleaning liquid, in response to detecting contamination on the sensor and determining that cleaning with the cleaning liquid is possible;

controlling a liquid cleaning actuator to clean the sensor by spraying with the cleaning liquid based on the command, and notifying that the sensor is being cleaned with the cleaning liquid;

continuing spraying of the cleaning liquid onto the sensor for a predetermined liquid cleaning time, and performing restricting vehicle speed in autonomous driving, or reducing autonomous driving level, or discontinuing autonomous driving, in response to the detecting contamination on the sensor after spraying of the cleaning liquid is continued for the predetermined liquid cleaning time.

11. The sensor cleaning apparatus according to claim 1, wherein:

the sensor comprises a camera; and the contamination detection unit detects that water droplets are attached to the sensor surface in response to a luminance difference being equal to or greater than a first luminance difference threshold and being less than a second luminance difference threshold, wherein the luminance difference is a difference between a maximum value and a minimum value of pixel values of a predetermined number or more pixels configuring image data acquired by the camera, the first luminance difference threshold is predetermined as a threshold for detecting that foreign matters are present on the sensor surface, the second luminance difference threshold is predetermined as a threshold for detecting that contamination other than water droplets are attached to the sensor surface, and the second luminance difference threshold is greater than the first luminance difference threshold.

12. The sensor cleaning apparatus according to claim 1, wherein:

the sensor comprises a LiDAR; and the contamination detection unit detects that water droplets are attached to the sensor surface in response to a light amount of laser light reflected by external environment of the vehicle being equal to or less than a first light amount threshold and being greater than a second light amount threshold, wherein the first light amount threshold is predetermined as a threshold for detecting that contamination is attached to the sensor surface, the second light amount threshold is predetermined as a threshold for detecting that contamination other than water droplets are attached to the sensor surface, and the second light amount threshold is less than the first light amount threshold.

* * * * *